United States Patent [19]
Iijima

[11] Patent Number: 5,226,155
[45] Date of Patent: Jul. 6, 1993

[54] METHOD AND SYSTEM FOR ALLOCATING FILE SPACE IN MEMORY OF IC CARD

[75] Inventor: Yasuo Iijima, Yokohama, Japan

[73] Assignee: Kabushiki Kaisha Toshiba, Kawasaki, Japan

[21] Appl. No.: 397,893

[22] Filed: Aug. 24, 1989

[30] Foreign Application Priority Data

Aug. 26, 1988 [JP] Japan ............... 63-211833

[51] Int. Cl.⁵ .................. G06F 12/02; G06F 15/40
[52] U.S. Cl. ............... 395/600; 364/DIG. 1; 364/222.82; 364/283.1; 902/26
[58] Field of Search ............. 902/4, 5, 26; 235/480, 235/380, 492; 364/200 MS File, 900 MS File, DIG. 1, DIG. 2; 395/600

[56] References Cited

U.S. PATENT DOCUMENTS

| | | | |
|---|---|---|---|
| 4,816,653 | 3/1989 | Anderl et al. | 902/26 |
| 4,829,169 | 5/1989 | Watanabe | 235/380 |
| 4,887,234 | 12/1989 | Iijima | 235/380 |
| 4,949,240 | 8/1990 | Iijima | 235/380 |
| 4,983,816 | 1/1991 | Iijima | 235/492 |
| 4,985,615 | 1/1991 | Iijima | 235/492 |
| 4,992,651 | 2/1991 | Takahira | 235/492 |

OTHER PUBLICATIONS

Sand, P., Advanced Pascal Programming Tech, 1984, 285-288.

Primary Examiner—David L. Clark
Assistant Examiner—John C. Loomis
Attorney, Agent, or Firm—Cushman, Darby & Cushman

[57] ABSTRACT

In a memory area of a data memory in an IC card, data file definition data for defining a data file is stored from one end of the memory area, and a data file is defined from the other end of the memory area. Area definition data for defining an area in a data file is stored from one end of a data file, and an area is defined from the other end of the data file.

4 Claims, 13 Drawing Sheets

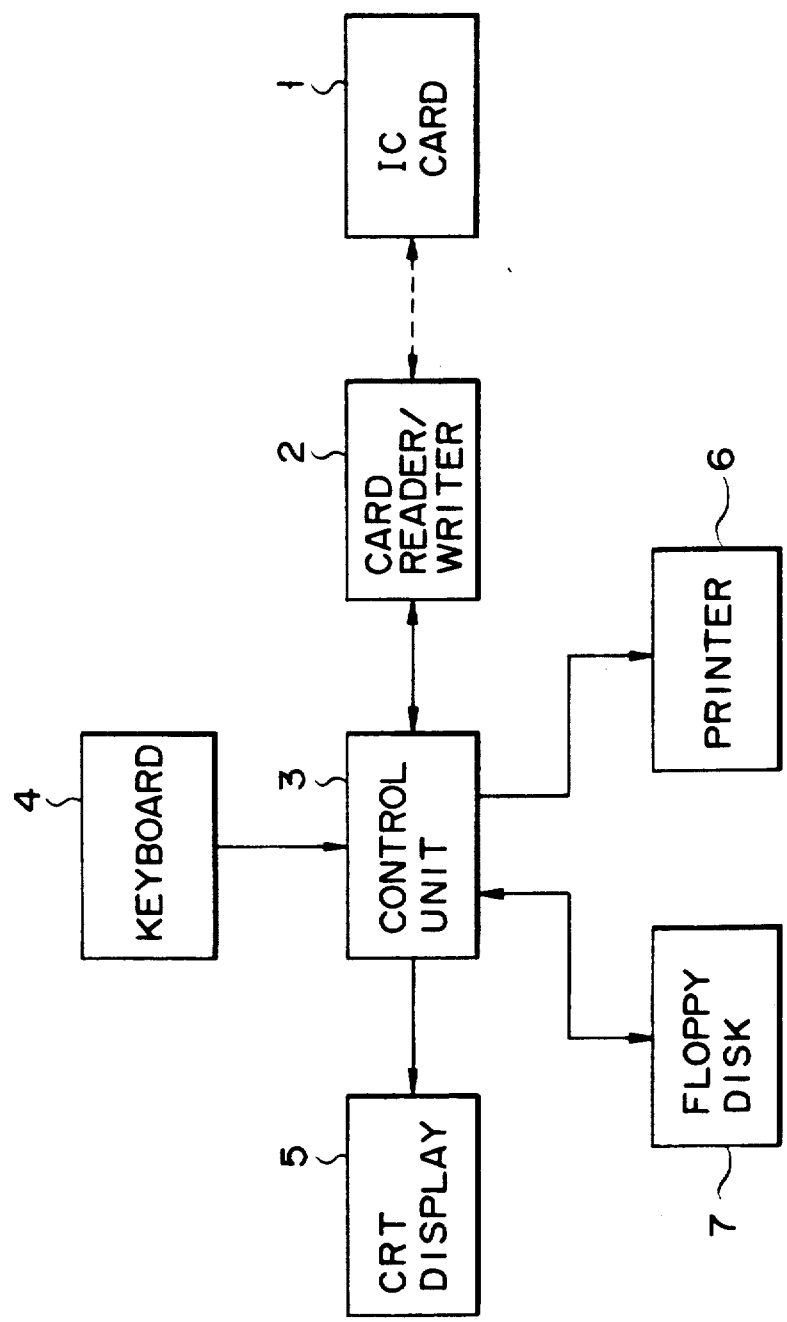
F I G. 1

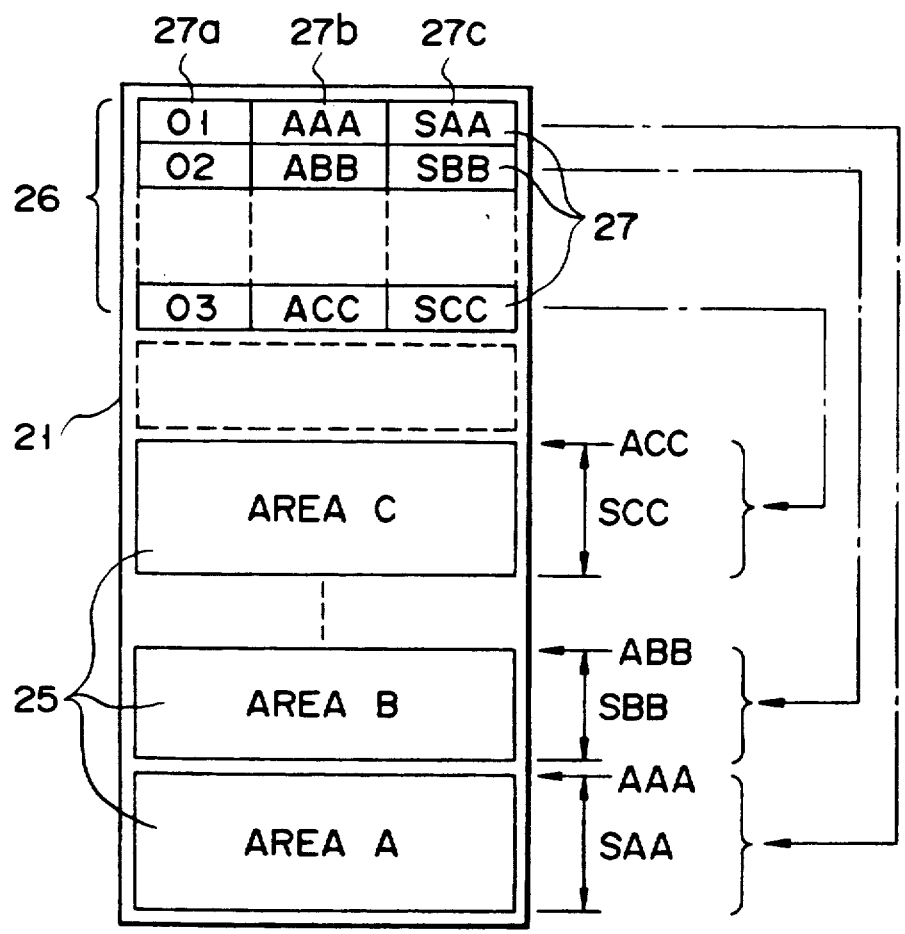
F I G. 6

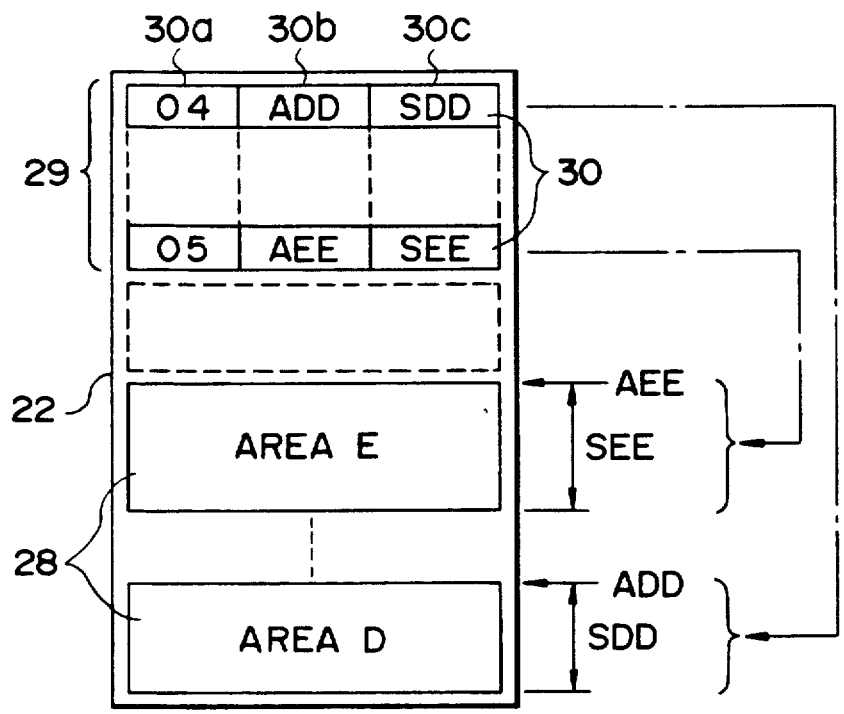
F I G. 7
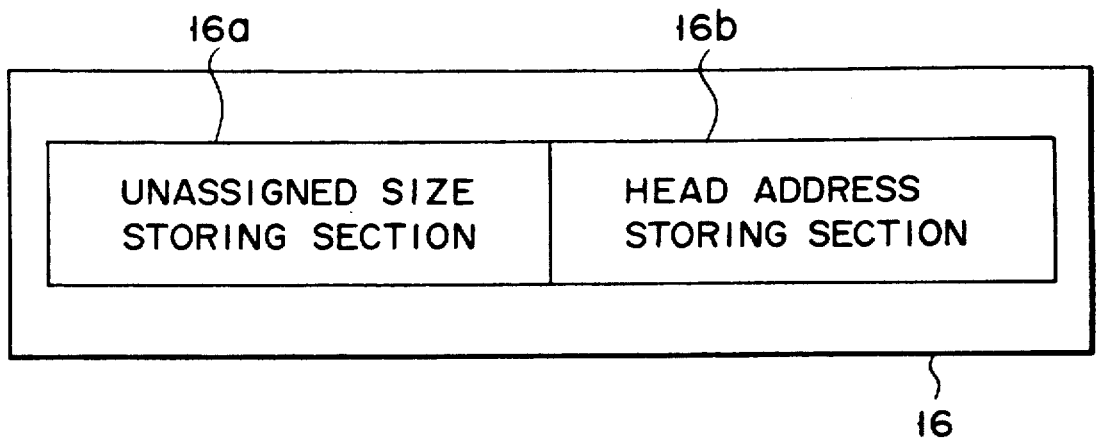
F I G. 9

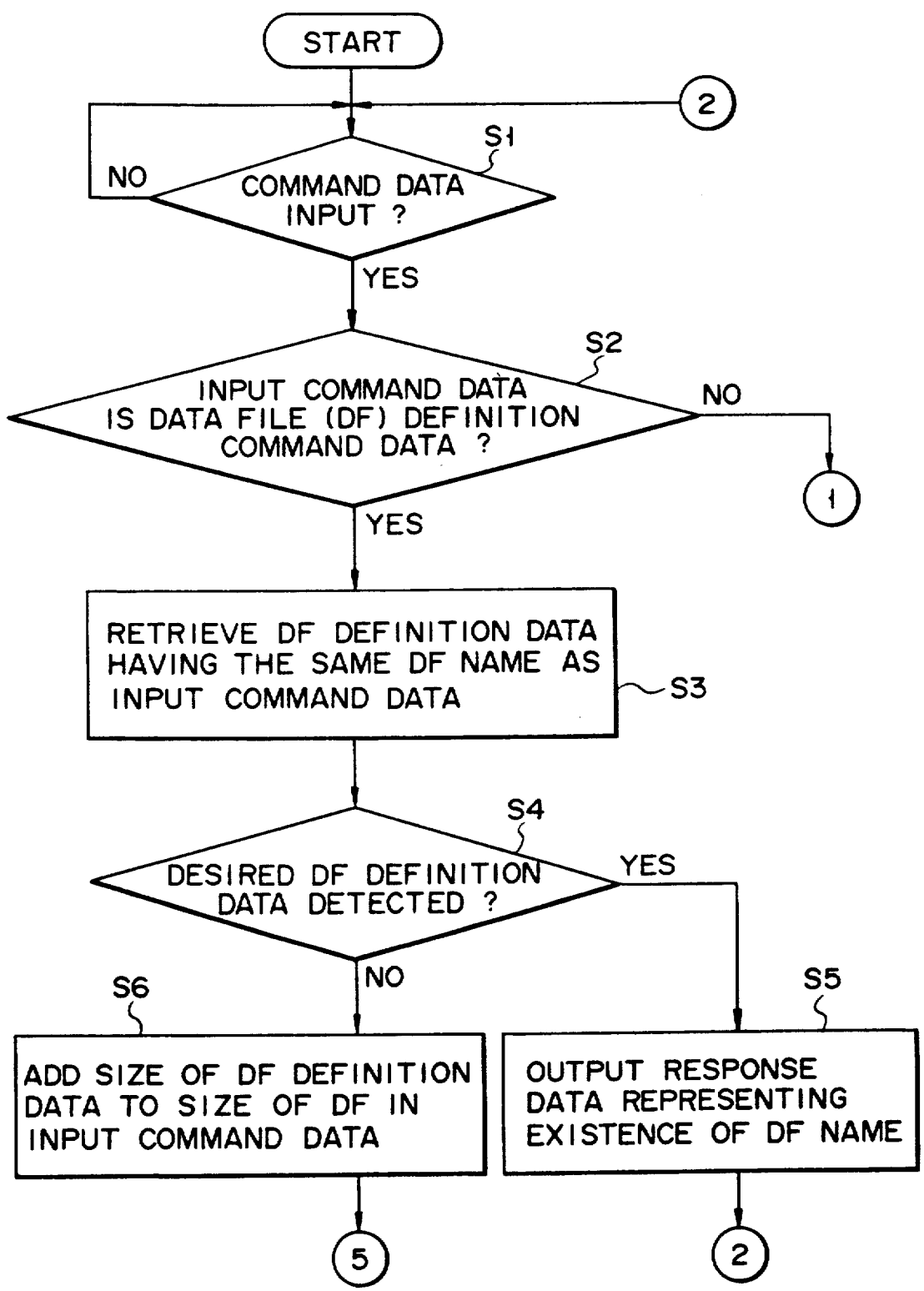
F I G. 10A

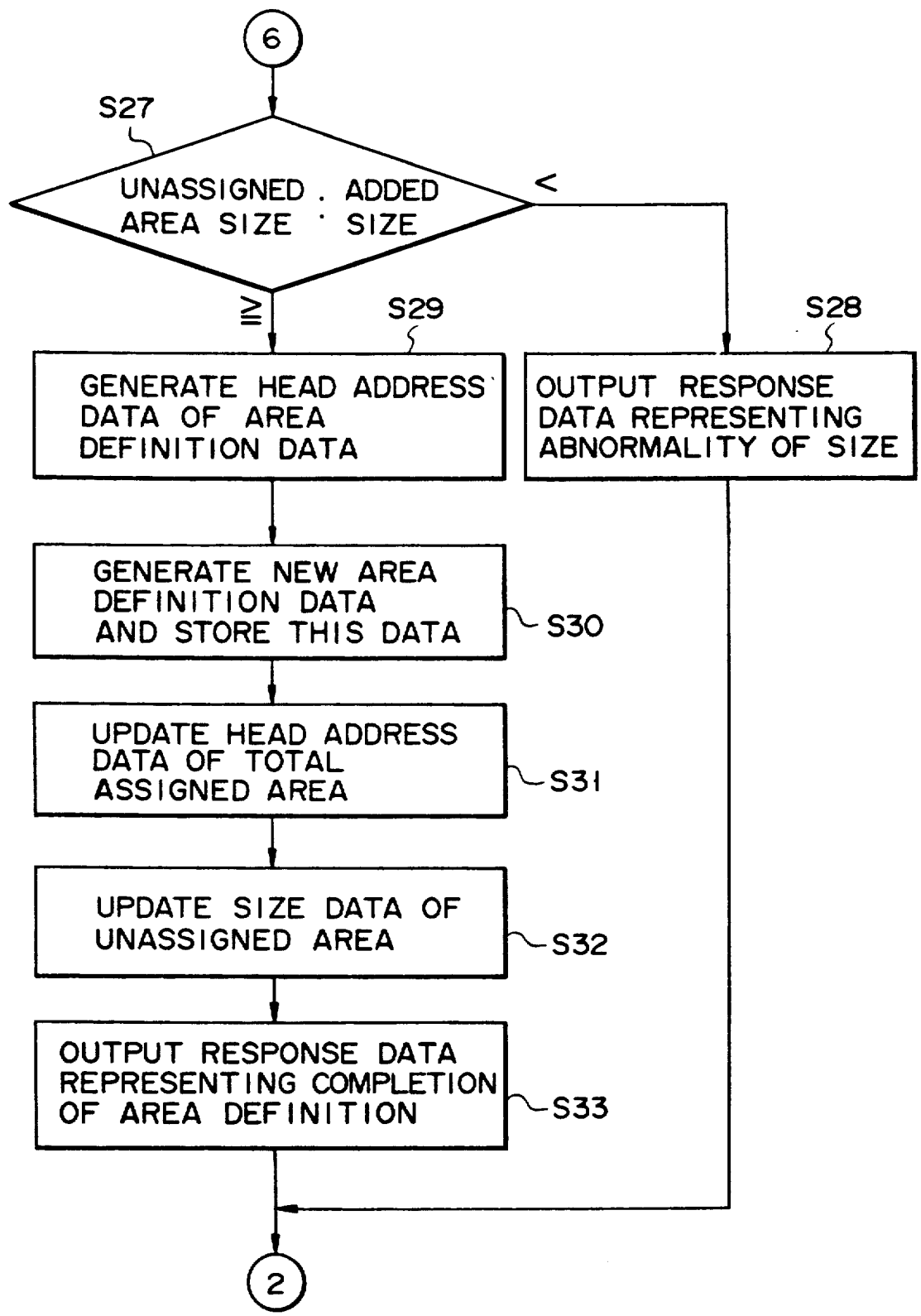
F I G. 10E

FIG. 13

| AREA DEFINITION COMMAND CODE | AREA NUMBER | ACCESS CONDITION DATA | AREA SIZE DATA |

FIG. 14A

| READOUT COMMAND CODE | AREA NUMBER |

FIG. 14B

| WRITE COMMAND CODE | AREA NUMBER | WRITE DATA |

METHOD AND SYSTEM FOR ALLOCATING FILE SPACE IN MEMORY OF IC CARD

BACKGROUND OF THE INVENTION

1. Field of the Invention

The present invention relates to a method and system for processing data in a memory of an IC card.

2. Description of the Related Art

In recent years, an IC (Integrated Circuit) card which incorporates an IC chip constituted by an erasable nonvolatile memory and a control element such as a CPU (Central Processing Unit) has attracted attention as a new portable data storing medium. This IC card causes the control element to access the memory and selectively performs data input/output for an external apparatus.

In order to use this IC card in various applications, the memory is divisionally defined as a plurality of data files, and each data file is divisionally defined as a plurality of areas. In addition, definition data representing a physical position and the like of each data file and each area are stored in the memory. The control element refers to the definition data to manage the memory area.

In a conventional IC card, however, since all of data file definition data each used to define a data file are stored in a memory having a memory area of a predetermined size, the number of data files which can be defined in a memory area is limited. In addition, since area definition data each for defining an area in a data file are stored in the same manner as described above, the number of areas which can be defined in each data file is limited.

For this reason, a demand has arisen for an IC card capable of efficiently managing a memory area.

SUMMARY OF THE INVENTION

It is an object of the present invention to provide a method and system for processing data in a memory of an IC card. One aspect of the present invention defines a method for using a processor to allocate a plurality of file areas and a plurality of data areas into a memory area of a memory in an IC card. The memory areas has a plurality of file areas for storing a plurality of file definition data in which a file name, file size data and file head address data are each included. The method starts by receiving file definition command data in which a file command, a file name and file size data are included. The processor is used to retrieve the file name included in the file definition command data in the memory area, to determine whether or not the same file name has been previously stored in the memory area. If not, the file size data in the file definition command data is added to size data of the file name and size data of the file size data itself in the file definition command data to obtain additional memory size data. The obtained additional memory size data is compared with memory size data of a total allocatable memory area. New file head address data of an allocated file area is generated beginning at a one-end memory address of the memory area and continuing toward an another-end memory address of the memory area when the obtained addition memory size data is equal to or smaller than the memory size data of the allocatable memory area. The new file head address data is obtained using the previous file head address data of the allocated file area and the file size data included in the file definition command data. The generated new file head address data is stored into new file definition data beginning at the another-end memory address of the memory area and extending toward the one-end memory address of the memory area to update the file head address data of the allocated file area.

The additional memory size data is subtracted from the memory size data of the allocatable memory area to obtain new memory size data of the allocated file area, and the new memory size data of the allocated file area, which is a part of the memory area which has been allocated, is stored.

Another aspect of the invention defines an apparatus for allocating a plurality of file areas in a similar way. This apparatus allocates a plurality of file areas and a plurality of data areas into a memory area of a memory in an IC card. The memory area has a plurality of file areas for storing a plurality of file definition data in which a file name, file size data and file head address data are each included. It includes means for receiving file definition command data in which a file command, a file name and a file size data are included.

The file name included in the file definition command data in the memory area, to determine whether or not the same file name has been previously stored in the memory area by a retrieving means. Means is provided for adding the file size data in the file definition command data to size data of the file name and size data of a file size data of a command in in the file definition command data to obtain additional memory size data when the same file name has not been stored in the memory area. Means determines for determining whether or not the obtained additional size data is equal to or smaller than memory size data of an allocatable memory area;

and another means generates new file head address data of an allocated file area beginning at a one-end memory address of the memory area and continuing toward an another-end memory address of the memory area when the obtained additional memory size data is equal to or smaller than the memory size data of the allocatable memory area. The new file head address data is obtained using previous file head address data of the allocated file area and the file size data included in the file definition command data.

The generated new file head address data is stored as new file definition data beginning at the another-end memory address of the memory area and extending toward the one-end memory address of the memory area to update the file head address data of the allocated file area.

The additional memory size data is subtracted from the memory size data of the allocatable memory area to obtain new memory size data of the allocated file area. This new size is stored as new memory size data of the allocated file area which represents a part of the memory area which has been allocated.

BRIEF DESCRIPTION OF THE DRAWINGS

FIG. 1 is a block diagram showing an arrangement of a terminal apparatus for handling an IC card according to an embodiment of the present invention;

FIG. 6 is a view showing an area structure in a common data file;

FIG. 7 is a view showing an area structure in an application data file;

FIG. 8 is a view showing a format of area definition data;

FIG. 9 is a block diagram showing an arrangement of a data memory.

FIG. 11 is a view showing a format of data file definition command data;

FIG. 12 is a view showing a format of data file selection command data;

FIG. 13 is a view showing a format of area definition command data; and

FIGS. 14A and 14B are views showing formats of readout command data and write command data, respectively.

DETAILED DESCRIPTION OF THE PREFERRED EMBODIMENTS

Figure 2:
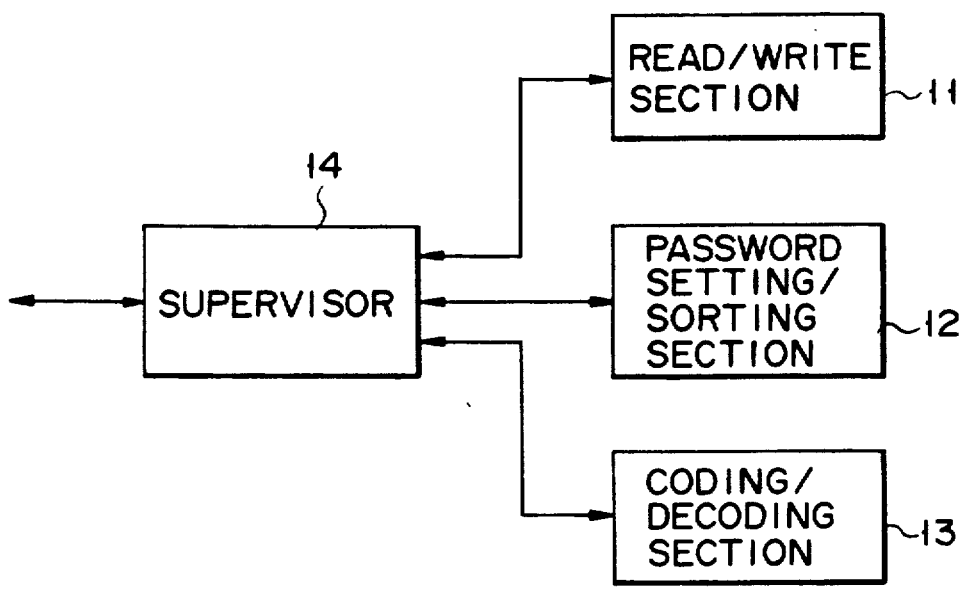
FIG. 2 is a block diagram showing a functional arrangement of the IC card.

An embodiment of the present invention will be described below with reference to the accompanying drawings.

Referring to FIG. 1, a terminal apparatus for handling an IC card 1 comprises a card reader/writer 2, a control unit 3 constituted by a CPU or the like, a keyboard 4, a CRT (Cathode Ray Tube) display 5, a printer 6, and a floppy disk 7.

For example, in case of purchasing goods, the IC card 1 carried by a user normally sorts a password and stores necessary data.

As shown in FIG. 2, the IC card is functionally constituted by a read/write section 11, a password setting/sorting section 12, a coding/decoding section 13, and a supervisor 14 for supervising these sections.

The read/write section 11 performs data read/write.

The password setting/sorting section 12 stores a password designated by a user and sorts the stored password.

In transmission of data to another terminal apparatus via a communication line, the coding/decoding section 13 codes data so as to prevent a leakage of data and decodes coded data. For example, data is processed in accordance with a coding algorithm capable of sufficiently preventing illicit entry, such as a DES (Data Encryption Standard).

The supervisor 14 operates the sections 11, 12, and 13 in accordance with data from the card reader/writer 2.

Figure 3:
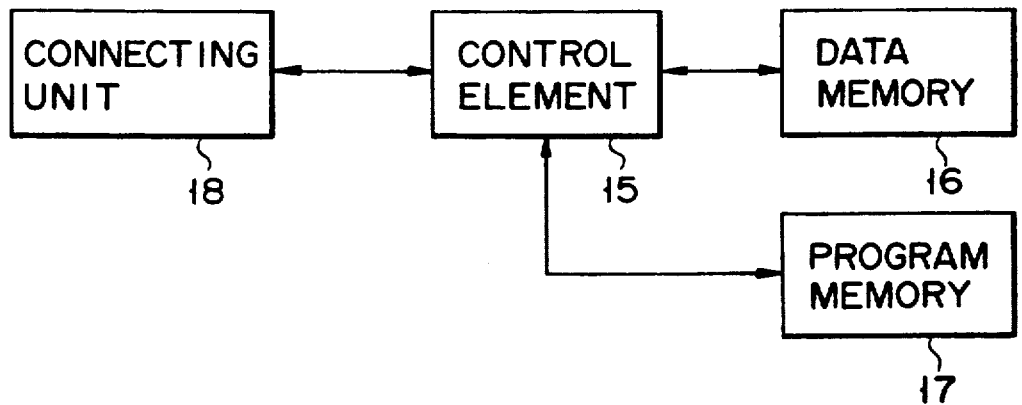
FIG. 3 is a block diagram showing an arrangement of the IC card.

In order to execute the above functions, the IC card 1 includes a control element 15 constituted by a CPU or the like, a data memory 16, a program memory 17, and a connecting unit 18 for connecting to the card reader/writer 2, as shown in FIG. 3. Note that the control element 15, the data memory 16, and the program memory 17 are arranged in an IC card constituted by one or a plurality of IC chips.

The program memory 17 constituted by a mask ROM (Read Only Memory) or the like stores control programs having subroutine programs for executing the above functions.

Figure 4:
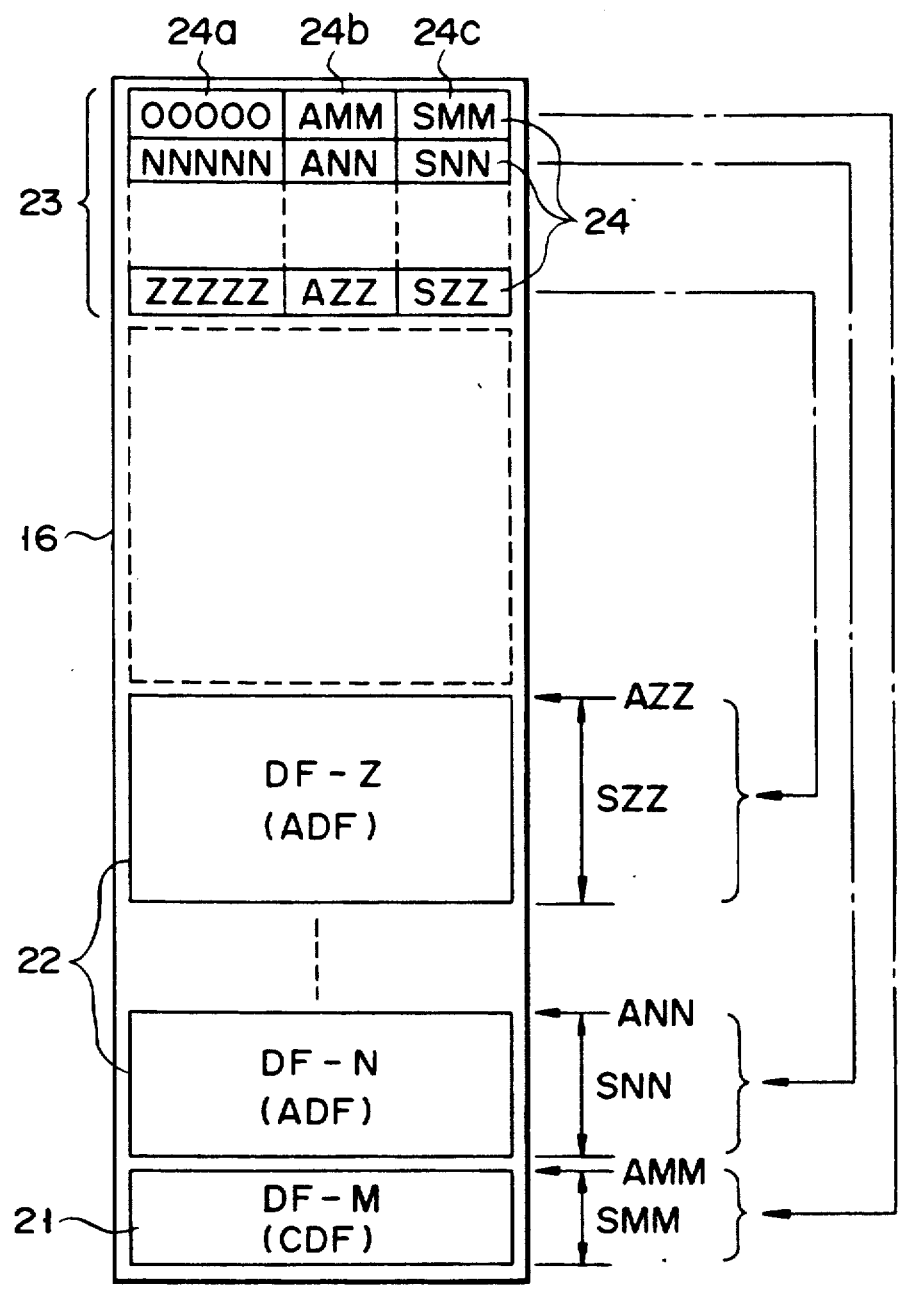
FIG. 4 is a view showing a data file structure of a data memory of the IC card.

The data memory 16 constituted by an EEPROM (Electrically Erasable Programmable Read Only Memory) or the like stores various data. As shown in FIG. 4, the memory 16 is divisionally defined as one common data file (CDF) 21 used commonly in all applications and a plurality of application data files (ADF) 22 independently used for each application. The CDF 21 and the ADF 22 are defined by data file definition data 24 of a data file definition table 23. In this case, for example, the data file definition data 24 are stored from a head address of the data memory 16. The CDF 21 and the ADF 22 are defined from an end address.

Figure 5:
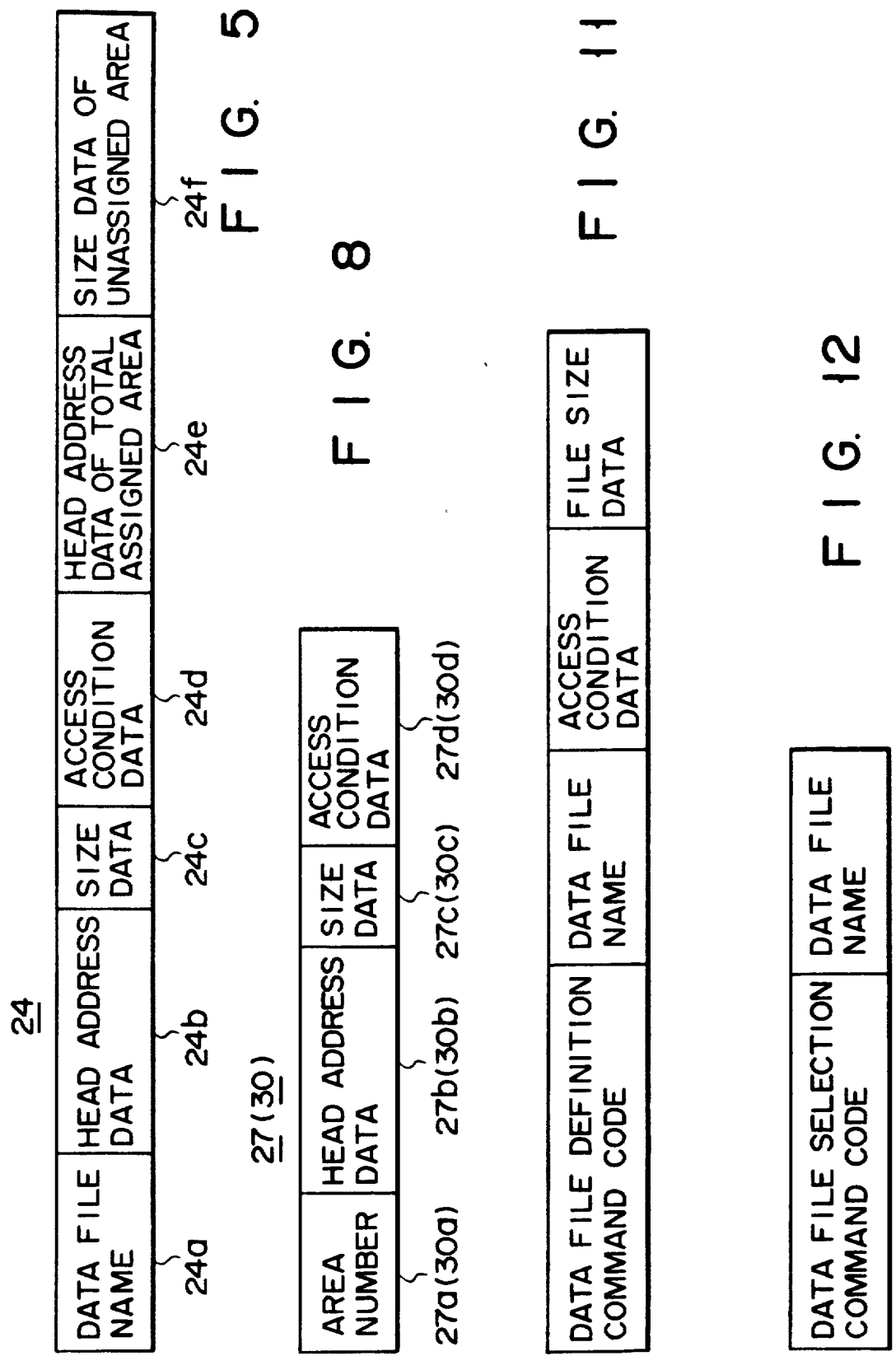
FIG. 5 is a view showing a format of data file definition data.
Figure 10B:
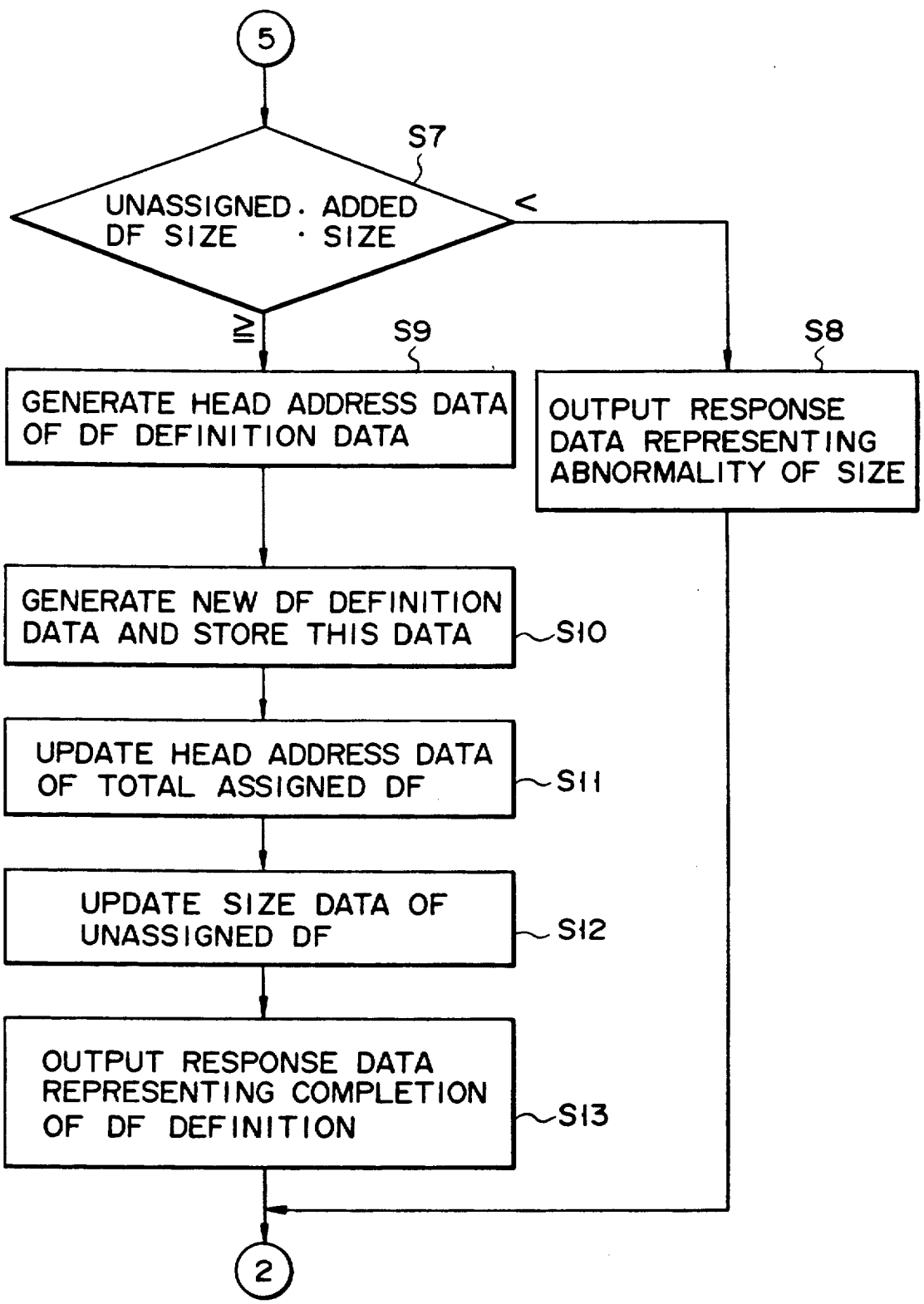
FIGS. 10A, 10B, 10C, 10D, 10E anbd 10F are flow charts for explaining operations of a control unit in the IC card.
Figure 10C:
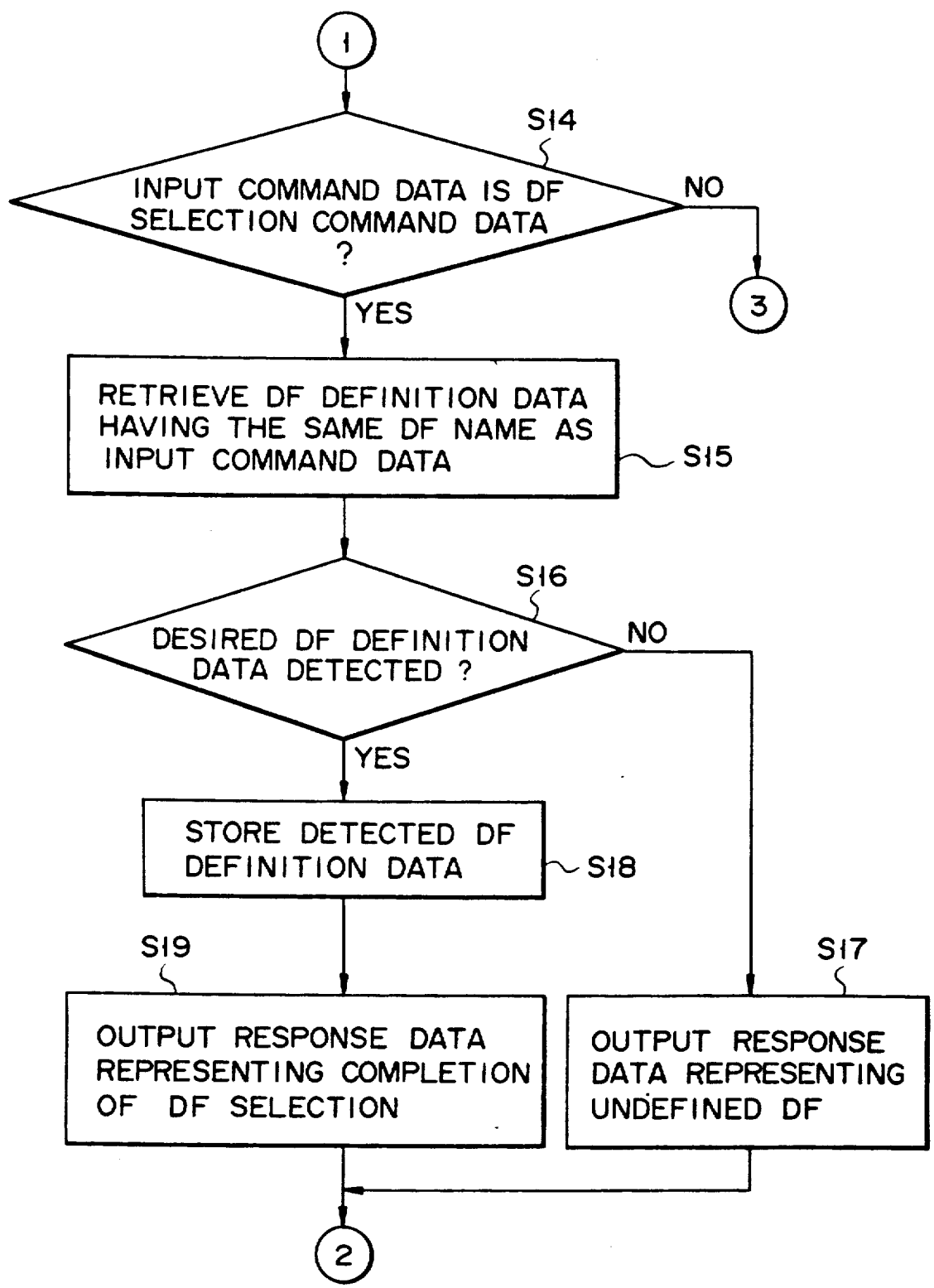
Figure 10D:
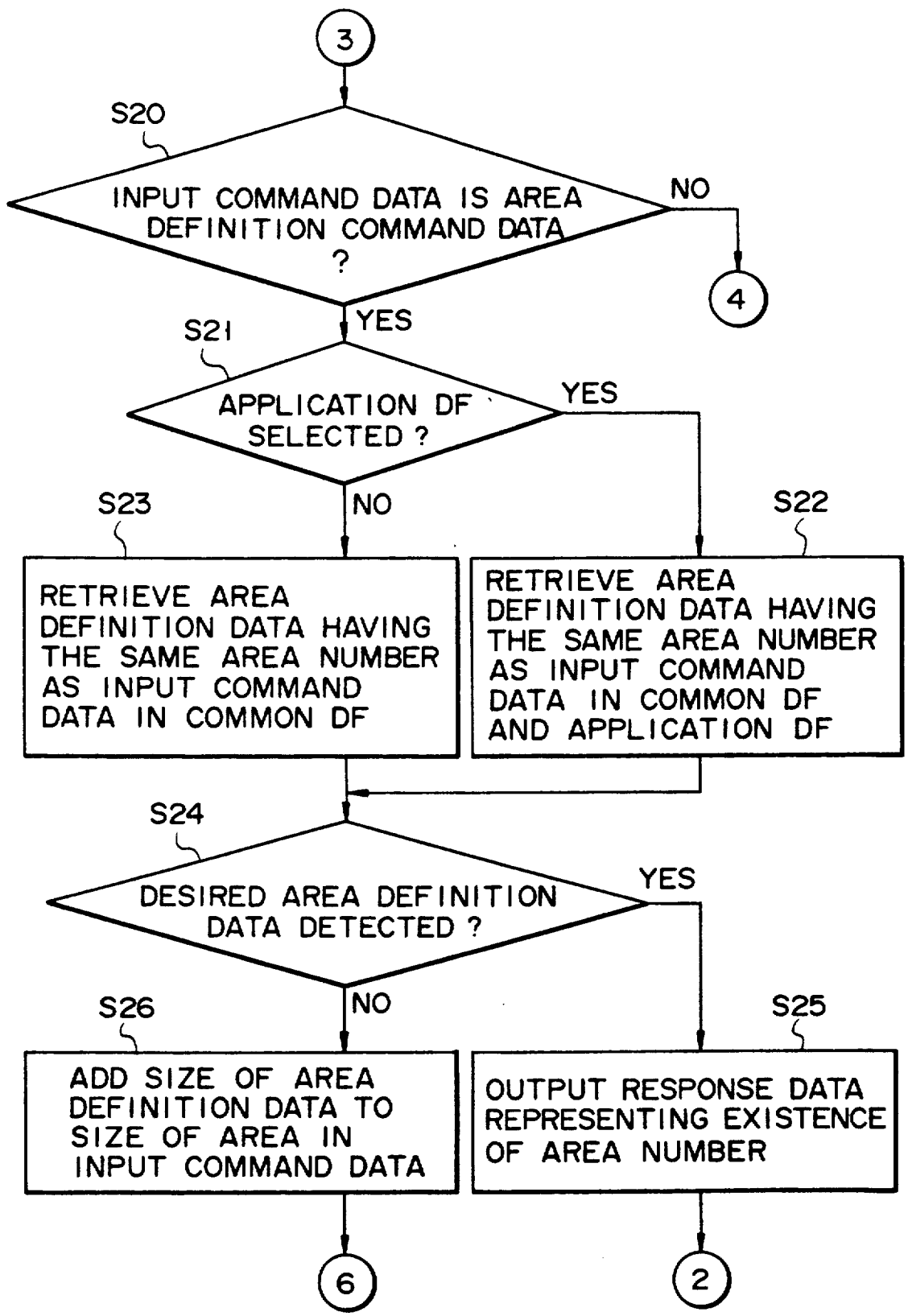
Figure 10F:
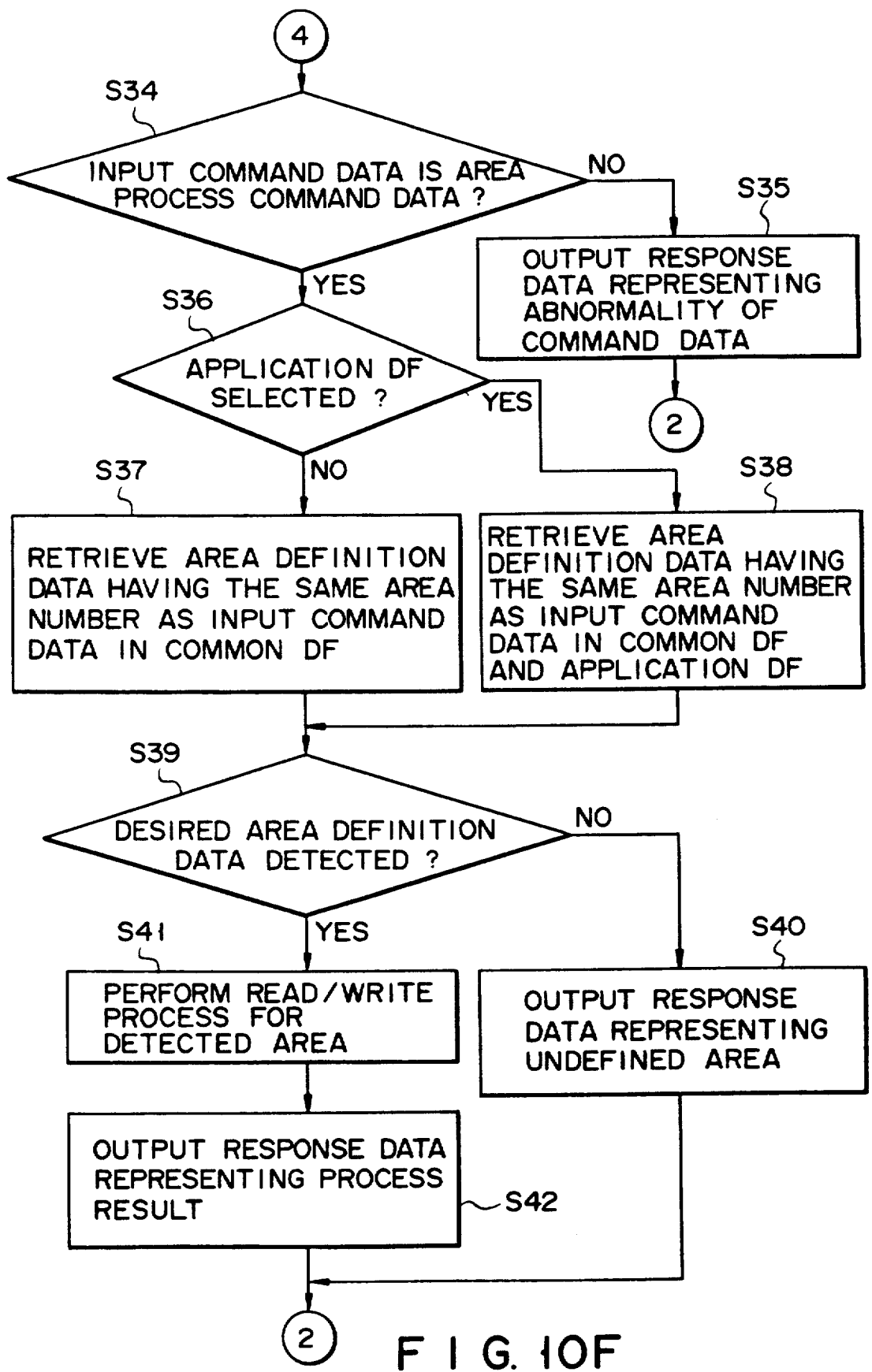

As shown in FIG. 5, the data file definition data 24 includes a data file name 24a as identification data for designating a data file, head address data 24b of an assigned data file, size data 24c, access condition data 24d, head address data of total assigned area 24e, and size data of unassigned area 24f.

If no area is defined in a defined data file, a value representing the size data of unassigned area corresponds to a maximum size value of the data file, and a value representing the head address data of total assigned area corresponds to a value obtained by incrementing a end address of the defined data file by one.

Referring to FIG. 4, the data file definition data 24 is stored in order of data file names "00000", "NNNNN", ..., "ZZZZZ" in accordance with data file definition command data to be described later. Note that a data file name "00000" of the CDF 21 is stored in advance.

The CDF 21 is divisionally defined as shown in FIG. 6, and the ADF 22 is divisionally defined as shown in FIG. 7. Areas 25 and 28 are defined by area definition data 27 and 30 of area definition tables 26 and 29, respectively. In this case, for example, the area definition data 27 and 30 are stored from head addresses of the data files 21 and 22, respectively. The areas 25 and 28 are defined from end addresses of the data files 21 and 22, respectively.

As shown in FIG. 8, the area definition data 27 (30) includes an area number 27a (30a), head address data 27b (30b) of an assigned area, size data 27c (30c), and access condition data 27d (30d).

The area definition data 27 shown in FIG. 6 is stored in order of area numbers "01", "02", ..., "03" in accordance with area definition command data to be described later. The area definition data shown in FIG. 7 is stored in order of area numbers "04", ..., "05".

As shown in FIG. 9, the data memory 16 includes an unassigned size storing section 16a and a head address storing section 16b. The section 16a stores size data of an unassigned data file. The section 16b stores head address data of a total assigned data file.

If no data file is assigned, a value representing the size data of the unassigned data file corresponds to a maximum size value for assigning a data file to the data memory 16. A value representing the head address data of the total assigned data file corresponds to a value obtained by incrementing an end address of the memory area of the data memory 16 by one.

A data file process and an area process performed by the control unit will be described below with reference to flow charts shown in FIGS. 10A to 10F.

(1) Data File Definition Process

In step S1, it is determined whether command data is externally input. If command data is input in step S1, it is determined whether the input command data is the data file (DF) definition command data as shown in FIG. 1 in step S2.

If the input command data is not the DF definition command data in step S2, processing in step S14 to be described later is executed.

If the input command data is the DF definition command data in step S2, DF definition data having the same DF name as the input command data is retrieved in the data memory 16 (step S3).

In step S4, it is determined whether DF definition data having the same DF name is detected. If desired DF definition data is detected in step S4, response data representing existence of the DF name is output (step S5).

If desired DF definition data is not detected in step S4, a size of a DF defined by the input command data is added to a size of a DF definition data (step S6).

In step S7, the added size obtained in step S6 is compared with an unassigned DF size. If the added size is larger than the unassigned DF size in step S7, it is determined that the DF defined by the input command data cannot be assigned to the data memory 16, and response data representing abnormality of a size is output (step S8).

If the added size is equal to o smaller than the unassigned DF size in step S7, it is determined that the DF defined by the input command data can be assigned to the data memory 16, and head address data of DF definition data is generated (step S9). Note that this head address data can be calculated by using a head address of a total assigned DF stored in the head address storing portion 16b and the file size represented by the input command data.

In step S10, new DF definition data is generated and stored in the data memory 16 in accordance with a DF name, access condition data, file size data, and the new head address data generated in step S9.

In step S11, the head address data of the total assigned data file is updated. That is, the head address data stored in the head address storing portion 16b is updated into the new head address data. In step S12, the size data of the unassigned DF is updated. That is, the size of the assigned DF and the size of the DF definition data are subtracted from the size stored in the unassigned size storing portion 16a, and a size obtained by this subtraction is stored as size data of a new unassigned DF in the storing portion 16a.

In step S13, response data representing completion of DF definition is output.

In this manner, as shown in FIG. 4, the DF definition data 24 is stored from the head address of the memory area for assigning a DF in the data memory 16. The DFs 21 and 22 are defined by the DF definition data 24 from the end address.

(2) Data File Selection Process

If the input command data is not the DF definition command data in step S1, it is determined whether the input command data is DF selection command data as shown in FIG. 12 in step S14.

If the input command data is not the DF selection command data in step S14, processing in step S20 to be described later is executed.

If the input command data is the DF selection command data in step S14, DF definition data having the same DF name as the input command data is retrieved in the data memory 16 (step S15).

In step S16, it is determined whether DF file definition data having the same DF name is detected. If desired DF definition data is not detected in step S16, response data representing an undefined DF is output (step S17).

If desired DF definition data is detected in step S16, the detected DF definition data is stored (step S18), and response data representing completion of DF selection is output (step S19).

(3) Area Definition Process

If the input command data is not the DF selection command data in step S14, it is determined whether the input command data is area definition command data as shown in FIG. 13 in step S20. If the input command data is not the area definition command data in step S20, processing in step S3 to be described later is executed.

If the input command data is the area definition command data in step S20 it is determined whether the ADF 22 is selected in step S21. This determination is performed by referring to the DF definition data stored upon DF selection.

If the ADF 22 is not selected in step S21, area definition data having the same area number as the input command data is retrieved in the CDF 21 (step S23).

If the ADF 22 is selected in step S21, area definition data having the same area number as input command data is retrieved in the CDF 21 and the ADF 22 (step S22).

In step S24, it is determined whether area definition data having the same area number as the input command data is detected. If desired area definition data is detected in step S24, response data representing existence of the area number is output (step S25). If desired are definition data is not detected in step S24, a size of area definition data is added to an area size represented by the input command data (step S26).

In step S27, the added size obtained in step S26 is compared with an unassigned area size. If the ADF 22 is not selected, unassigned area size represented by DF definition data for defining the CDF 21 is used. If the ADF 22 is selected, unassigned area size represented by DF definition data for defining the ADF 22 is used.

If the added size is larger than the unassigned area size in step S27, it is determined that the area defined by the input command data cannot be assigned to the DF, and response data representing abnormality of the size is output (step S28).

If the added size is equal to or smaller than the unassigned area size in step S27, it is determined that the area defined by the input command data can be assigned to the DF, and head address data represented by the area definition data is generated (step S29). This head address data is calculated in accordance with a total assigned area head address represented by the DF definition data and the area size represented by the input command data. Note that if the ADF 22 is not selected, area size data represented by the DF definition data for defining the CDF 21 is used. If the ADF 22 is selected, area size data represented by the DF definition data for defining the ADF 22 is used.

In step S30, new area definition data is generated and stored in accordance with an area number, access condition data, area size data, and the head address data generated in step S29.

In step S31, the head address data of total assigned area is updated. That is, the head address data of total assigned area represented by the DF definition data is updated into the new head address data. In step S32, the unassigned area size data is updated. That is, the assigned area size and the size of the area definition data are subtracted from the unassigned area size represented by the DF definition data. The size obtained by this subtraction is stored as new unassigned area size data.

In step S33, response data representing completion of area definition is output.

In this manner, as shown in FIGS. 6 and 7, the area definition data 27 and 30 are stored from the head addresses of the DFs. The areas 25 and 28 are defined from the end addresses of the DFs in accordance with the area definition data 27 and 30, respectively.

(4) Area Process (Data Read/Write in Area)

If the input command data is not the area definition command data in step S20, it is determined whether the input command data is area process command data in step S34. Note that the area process command data includes readout command data (FIG. 14A) or write command data (FIG. 14B).

If the input command data is not the area process command data in step S34, response data representing abnormality of the command data is output (step S35).

If the input command data is area process command data in step S34, it is determined whether the ADF 22 is selected in step S36. This determination is performed by referring to the DF definition data stored upon DF selection.

If the ADF 22 is not selected in step S36, area definition data having the same area number as the input command data is retrieved in the CDF 21 (step S37).

If the ADF 22 is selected in step S36, area definition data having the same area number as the input command data is retrieved in the CDF 21 and the ADF 22 (step S38).

In step S39, it is determined whether area definition data having the same area number is detected. If desired area definition data is not detected in step S39, response data representing an undefined area is output (step S40).

If desired area definition data is detected in step S39, a data read/write process is performed for the area (step S41).

In step S42, response data representing a process result is output.

As described above, DF definition data for defining a DF is stored from one end of a memory area of the data memory, while a DF is defined from the other end of the memory area of the data memory. Area definition data for defining an area in a DF is stored from one end of a DF, while an area is defined from the other end of the DF. In this manner, the memory area in the data memory can be effectively used. In addition, a limit of the number of DFs which can be defined in the memory area of the data memory and that of the number of areas which can be defined in each DF can be reduced.

In the above embodiment, DF definition data is stored from the head address of the memory area of the data memory, and a DF is defined from the end address. However, DF definition data may be stored from the end address while a DF is defined from the head address. In addition, storage of area definition data and definition of an area can be performed for each DF.

The embodiment of the present invention has been described. However, the present invention is not limited to the above embodiment but can be modified and carried out without departing from the spirit and scope of the invention.

What is claimed is:

1. A method for using a processor to allocate a plurality of file areas and a plurality of data areas into a memory area of a memory which stores size data, indicative of an allocatable memory size in an IC card, the memory area having the plurality of file areas for storing a plurality of file definition data in which a file name, file size data and file head address data are each included, the method comprising the steps of:

receiving file definition command data in which a file command, a file name and file size data are included;

using the processor to access the memory area based on the file name included in the file definition command data, to determine whether the same file name has been previously stored in the memory area;

adding the file size data in the file definition command data to size data of the file name and to a size data of a command in the file definition command data to obtain additional memory size data when the same file name has not been previously stored in the memory area;

determining whether the obtained additional memory size data is equal to or smaller than memory size data of a total allocatable memory area;

generating new file head address data of an allocated file area beginning at a one-end memory address of the memory area and continuing toward an another-end memory address of the memory area when the obtained additional memory size data is equal to and smaller than the memory size data of the allocatable memory area, the new file head address data being obtained by adding previous file head address data of the allocated file area to the file size data include din the file definition command data;

storing the generated new file head address data into new file definition data beginning at the another-end memory address of the memory area and extending toward the one-end memory address of the memory area to update the file head address data of the allocated file area;

subtracting the additional memory size date from the memory size data of the allocatable memory area to obtain new memory size data of the allocatable file area; and storing the new memory size data of the allocatable file area the new memory size data being stored in a part of the memory area which is an allocatable memory area.

2. The method according to claim 1, wherein each of the file areas with an allocatable file area size has the plurality of data areas and stores a plurality of area definition data in which an area number, area size data and area head address data are each included, and the method further comprising the steps of:

receiving area definition command data in which an area command, an area number and area size data are included;

retrieving the area number included in the area definition command data in the file area, to determine whether or not the same area number has been stored in the file area;

adding the area sizes data in the area definition command data to size data of the area number and the area size data in the area definition command data to obtain the additional file size data when the same area number has not been stored in the file area;

determining whether or not the obtained additional file size data is equal to or smaller than file size data of an allocatable file area;

generating new area head address data of an allocated data area beginning at a one-end file address of the file area and continuing toward an another-end file address of the file area when the obtained additional file size data is equal to or smaller than the file size data of the allocatable file area, the new area head address data being obtained by adding previous areas head address data of the allocated data area to the area size data included in the area definition command data;

storing the generated new area head address data into new area definition data beginning at the another-end file address of the file area and extending toward the one-end file address of the file area to update the area head address data of the allocated data area;

subtracting the additional file size data from the file size data of the allocatable file area to obtain new file size data of the allocatable data area; and storing the new file size data of the allocatable data area the new file size data being stored in a part of the file area which is an allocatable file area.

3. An apparatus for allocating a plurality of file areas and a plurality of data areas into a memory area of a memory which stores size data of an allocatable memory size in an IC card, the memory area having the plurality of file areas for storing a plurality of file definition data in which a file name, file size data and file head address data are each included, the apparatus comprising:

means for receiving file definition command data in which a file command, a file name and a file size data are included;

means for accessing the memory area using the file name included in the file definition command data, to determine whether the same file name has been previously stored in the memory area;

means for adding the file size data in the file definition command data to size data of the file name and to a size data of a command in the file definition command data to obtain additional memory size data when the same file name has not been stored in the memory area;

means for determining whether the obtained additional size data is equal to or smaller than memory size data of an allocatable memory area;

mans for generating new file head address data of an allocated file area beginning at a one-end memory address of the memory data and continuing toward an another-end memory address of the memory area when the obtained additional memory size data is equal to or smaller than the memory size data of the allocatable memory area, the new file head address data being obtained by adding previous file head address data of the allocated file area to the file size data included in the file definition command data;

means for storing the generated new file head address data into new file definition data beginning at the another-end memory address of the memory area and extending toward the one-end memory address of the emory area to update the file head address data of the allocated file area;

means for subtracting the additional memory size data from the memory size data of the allocatable memory area to obtain new memory size data of the allocatable file area; and means for storing the new memory size data of the allocatable file area, the new memory size data being stored in a part of the memory area which is an allocatable memory area.

4. The apparatus according to claim 3, wherein each of the file areas with an allocatable file area size has the plurality of data areas and stores a plurality of area definition data in which an area number, area size data and area head address data are each included, and the apparatus further comprises:

means for receiving area definition command data in which an area command, an area number and area size data are included;

means for retrieving the area number included in the area definition command data in the file area, to determine whether or not the same area number has been previously stored in the file area;

means for adding the area size data in the area definition command data to size data of the area number and the area size data in the area definition command data to obtain additional file size data when the same area number has not been stored in the file area;

means for determining whether to not the obtained addition file size data is equal to or smaller than file size data of an allocatable file area;

means for generating new area head address data of an allocated data area beginning at a one-end file address of the file area and continuing toward another-end file address of the file area when the obtained addition file size data is equal to smaller than the file size data of the allocatable file area, the new area head address data being obtained by adding previous area head address data of the allocated data area to the area size data included in the area definition command data;

means for storing the generated new area head address data into new area definition data beginning at the another-end file address of the file area and extending toward the one-end file address of the file area to update the area head address data of the allocated data area;

means for subtracting the additional file size data from the file size data of the allocatable file area to obtain new file size data of the allocatable data area; and means for storing the new file size data of the allocatable data area the new file size data being stored in a part of the file area which is an allocatable file area.

* * * * *